(12) United States Patent
Kawaguchi et al.

(10) Patent No.: US 8,024,969 B2
(45) Date of Patent: Sep. 27, 2011

(54) LIQUID LEVEL DETECTION DEVICE

(75) Inventors: Yasunori Kawaguchi, Shimada (JP); Kenichi Tanaka, Shimada (JP); Toshio Oike, Shimada (JP)

(73) Assignee: Yazaki Corporation, Tokyo (JP)

( * ) Notice: Subject to any disclaimer, the term of this patent is extended or adjusted under 35 U.S.C. 154(b) by 537 days.

(21) Appl. No.: 12/149,666

(22) Filed: May 6, 2008

(65) Prior Publication Data
US 2008/0295592 A1 Dec. 4, 2008

(30) Foreign Application Priority Data

May 31, 2007 (JP) ................ P2007-145704
Oct. 30, 2007 (JP) ................ P2007-281972

(51) Int. Cl.
*G01F 23/00* (2006.01)
(52) U.S. Cl. ........................ 73/304 R; 73/313
(58) Field of Classification Search .............. 73/313, 73/314, 304 R
See application file for complete search history.

(56) References Cited

U.S. PATENT DOCUMENTS

| | | | |
|---|---|---|---|
| 4,782,699 A | 11/1988 | Gonze | 73/308 |
| 5,341,679 A * | 8/1994 | Walkowski et al. | 73/317 |
| 7,140,247 B2 | 11/2006 | Forgue et al. | 73/313 |
| 2003/0098660 A1 * | 5/2003 | Erdman et al. | 318/254 |
| 2004/0212252 A1 * | 10/2004 | Ohtaki et al. | 307/10.3 |
| 2006/0219003 A1 | 10/2006 | Forgue et al. | 73/313 |

FOREIGN PATENT DOCUMENTS

| | | |
|---|---|---|
| DE | 10 2004 045 873 A1 | 3/2006 |
| DE | 10 2005 013 771 A1 | 9/2006 |
| DE | 10 2006 015 595 A1 | 11/2006 |
| JP | 63-138215 | 6/1988 |
| JP | 2002-214023 | 7/2002 |
| JP | 2006-214828 | 8/2006 |
| JP | 2006214828 A * | 8/2006 |
| JP | 3898913 B | 1/2007 |
| WO | WO 2006/032602 | 3/2006 |

* cited by examiner

*Primary Examiner* — Hezron E Williams
*Assistant Examiner* — Tamiko Bellamy
(74) *Attorney, Agent, or Firm* — Morgan, Lewis & Bockius LLP

(57) ABSTRACT

A liquid level detection device includes a sensor provided in a container which stores a liquid therein and having a variable resistance which changes a resistance value in association with a change of liquid level to output a voltage signal according to the resistance value of the variable resistance when a voltage is applied thereto, and a power supply circuit applying the voltage to the sensor intermittently on a predetermined cycle. A conducting time during which the power supply circuit applies the voltage to the sensor is equal to or less than 40 ms per cycle.

3 Claims, 9 Drawing Sheets

LIQUID LEVEL DETECTION DEVICE

BACKGROUND

The present invention relates to a liquid level detection device, and more particularly a liquid level detection device which is suitable for detecting a residual fuel amount of a vehicle such as a motor vehicle which uses an electrolytic fuel such as alcohol itself like ethanol or methanol or alcohol-based fuel which contains such alcohols.

An example of a conventional liquid level detection device is shown in FIG. 9. A liquid level detection device 101 shown in FIG. 9 has a sensor 102 disposed within a container which stores a liquid therein. The sensor 102 has a variable resistance 103 which changes a resistance value by allowing a contact to move in association with a change in liquid level to thereby output a voltage signal according to a resistance value of the variable resistance 3 when a predetermined voltage is applied to the sensor. In addition, the liquid level detection device 101 includes a power supply circuit 104 which applies a voltage to the sensor 102 (for example, refer to Patent Document No. 1).

An example of the configuration of the sensor 102 is shown in FIG. 10. The sensor 102 shown in FIG. 10 includes an arm 111 to a distal end of which a float 110 adapted to float in the liquid is attached, a frame 112 which supports rotatably a proximal end portion of the arm 111, a circuit board 113 mounted on the frame 112 and a contact element 114 provided at the proximal end portion of the arm 111. A resistor, not shown, is formed on a surface of the circuit board 113, and a predetermined voltage is applied to this resistor by the power supply circuit 104. The contact element 114 swings about an rotational axis of the arm 111 in association with rotation of the arm 111 and slides over the resistor on the circuit board 113 (for example, refer to Patent Document No. 4).

One end of the resistor of the circuit board 113 and the contact element 114 are electrically connected to output terminals 115, 116 of the sensor 102, respectively. The float 110 fluctuates while linking with a change in liquid level, and the arm 111 rotates in association with fluctuation of the float 110, causing the contact element 114 to slide over the resistor, whereby a resistance value of a portion of the resistor which lies between the end where the resistor connects to the output terminal 115 to the contact element 114 (hereinafter, referred to as a first region of the resistor) changes. Namely, the variable resistance 103 is made up of the resistor and the contact element 114. The voltage applied to the resistor is divided according to the resistance value of the first region of the resistor, and the voltage applied to this first region is detected between the output terminals 115, 116 as an output signal of the sensor 102.

Referring to FIG. 9 again, the liquid level detection device 101 obtains the output signal of the sensor 102 at a processing circuit 105 and drives a gauge 106 which indicates a residual amount of the liquid based on the signal so obtained.

Incidentally, when detecting a residual amount of fuel of a vehicle such as a motor vehicle, the sensor 102 of the liquid level detection device 101 is disposed within a fuel tank, and in recent years, bio-ethanol or the like is used for fuel of a vehicle. Alcohol-based fuel such as bio-ethanol is an electrolytic liquid, and when the sliding contact surfaces of the resistor and the contact element 114 of the sensor 102 are exposed to the electrolytic liquid, an electrochemical reaction such as electrolytic corrosion is produced on the sliding contact surfaces as the voltage is applied thereto, as a result of which the sliding contact surfaces are deteriorated, and this raises the contact resistance at the contact portion, interrupting an accurate measurement. In order to avoid the drawback like this, there is proposed a technique in which a voltage is applied to the sensor intermittently in a predetermined cycle (for example, refer to Patent Document Nos. 1 to 3).

| [Patent Document No. 1] | JP-A-2002-214023 |
| [Patent Document No. 2] | JP-A-63-138215 |
| [Patent Document No. 3] | JP-A-2006-214828 |
| [Patent Document No. 4] | JP-B-3898913 |

Here, although the conducting time (energizing time) constitutes an important factor in electrochemical reaction such as electrolytic corrosion, in Patent Document Nos. 1 to 3 above, nothing is stated about a preferable conducting time per cycle, and no sufficient countermeasures has been taken in those related art liquid level detection devices.

SUMMARY

The invention has been made in view of these situations, and an object thereof is to provide a liquid level detection device which can detect a liquid level with high accuracy over a long period of time even when it is exposed to electrolytic liquid.

The object will be attained by a liquid level detection device according to the invention described under (1) to (6) below.

(1) A liquid level detection device comprises:
  a sensor provided in a container which stores a liquid therein and having a variable resistance which changes a resistance value in association with a change of liquid level to output a voltage signal according to the resistance value of the variable resistance when a voltage is applied to the sensor; and
  a power supply circuit applying the voltage to the sensor intermittently on a predetermined cycle,
  wherein a conducting time during which the power supply circuit applies the voltage to the sensor is equal to or less than 40 ms per cycle.

(2) Preferably, the conducting time is equal to or less than 15 ms per cycle.

(3) Preferably, the conducting time is greater than 1 ms per cycle.

(4) Preferably, the conducting time is substantially 5 ms per cycle.

(5) Preferably, a ratio of the conducting time in one cycle is 50% or less.

(6) Preferably, the variable resistance includes: first conductive patterns and second conductive patterns which are extended in parallel to each other; and a contact element which slides on the first conductive patterns and the second conductive patterns in association with the change of the liquid level. The conducting time per cycle is set to a predetermined time so that a time period that elapses until a current flowing to the first and second conductive patterns comes to indicate a rising tendency is equal to or greater than 60 seconds when the voltage is applied to the sensor in a state that a contact portion between the contact element and the first and second conductive patterns is electrically insulated.

According to the liquid level detection device that is configured as has been described above, even when the detection device is exposed to electrolytic liquid, the electrochemical reaction such as electrolytic corrosion is suppressed which would otherwise be produced at the contact portions of the variable resistance. The following will be considered as the reason that the electrochemical reaction is suppressed. Molecules involved in a chemical reaction need to ride over an energy barrier before they are transformed into a product. In electrolytic corrosion at the contact point, as shown in FIG. 4, molecules need to ride over a barrier of potential energy existing on a metallic surface of the contact portion. When given energy exceeding the potential energy through energization, the molecules are activated to emit electrons and are then ionized to be eluted. In the event that the conducting time per cycle is 40 ms or less, the metallic molecules at the contact portion are not exited to reach from the ground state S1 to the excited or activated state S2 and hence return to the ground state S1. The conducting time per cycle is preferably 15 ms or less, more preferably is more than 1 ms but equal to or less than 15 ms, and much more preferably is substantially 5 ms. In the event that the conducting time per cycle is 1 ms or less, there is a fear that there may be a shortage of sampling time when sampling an output signal of the sensor. This is because the rise of an output signal of the sensor that is to be inputted into an A/D converter is delayed by a capacitor, which may be interposed between the sensor and the A/D converter to prevent a direct current from flowing into the A/D converter. In addition, since a time required for the molecules to return to the ground state S1 becomes more than the time required for excitation, the ratio of conducting time per cycle is preferably 50% or less.

In addition, when the voltage is applied to the sensor in such a state that the first and second conductive patterns of the variable resistance are electrically insulated from the contact element, a capacitor is formed between the first and second conductive patterns. When the voltage applied is higher than a withstand voltage, an electrolysis is produced on the first and second conductive patterns which constitute electrodes of the capacitor, and a current flows. The liquid level detection device that is configured as has been described above is such as to select a more suitable conducting time based on conducting time and temporal characteristic until a point in time at which the current value starts to rise by paying attention to the fact that the longer the time required until the current value starts to rise, the more difficult the metals on the first and second conductive patterns are made to be eluted and the more difficult the metal ions that have been eluted out are made to move. The metal ions that have been eluted move from the anode to the cathode mainly by way of migration when energized, while they so move by way of dispersion or convection when not energized. Since when they move by way of dispersion or convection, the metal ions move (disperse) in various directions between the first and second conductive patterns, the moving speed of the metal ions which move towards the cathode side conductive pattern of the two conductive patterns becomes slow. Namely, the electrochemical reaction is suppressed. In addition, when the conducting time per cycle is 15 ms or less, the time required until the current value starts to rise becomes 60 seconds or more, whereby the elution suppression tendency of metal ions increases remarkably.

According to the invention, even when the sensor is exposed to electrolytic liquid, the electrochemical reaction such as electrolytic corrosion at the contact portions of the variable resistance of the sensor can be suppressed, whereby the liquid level can continue to be detected with high accuracy over a long time period.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, a preferred embodiment of the invention will be described by reference to the drawings.

Figure 1:
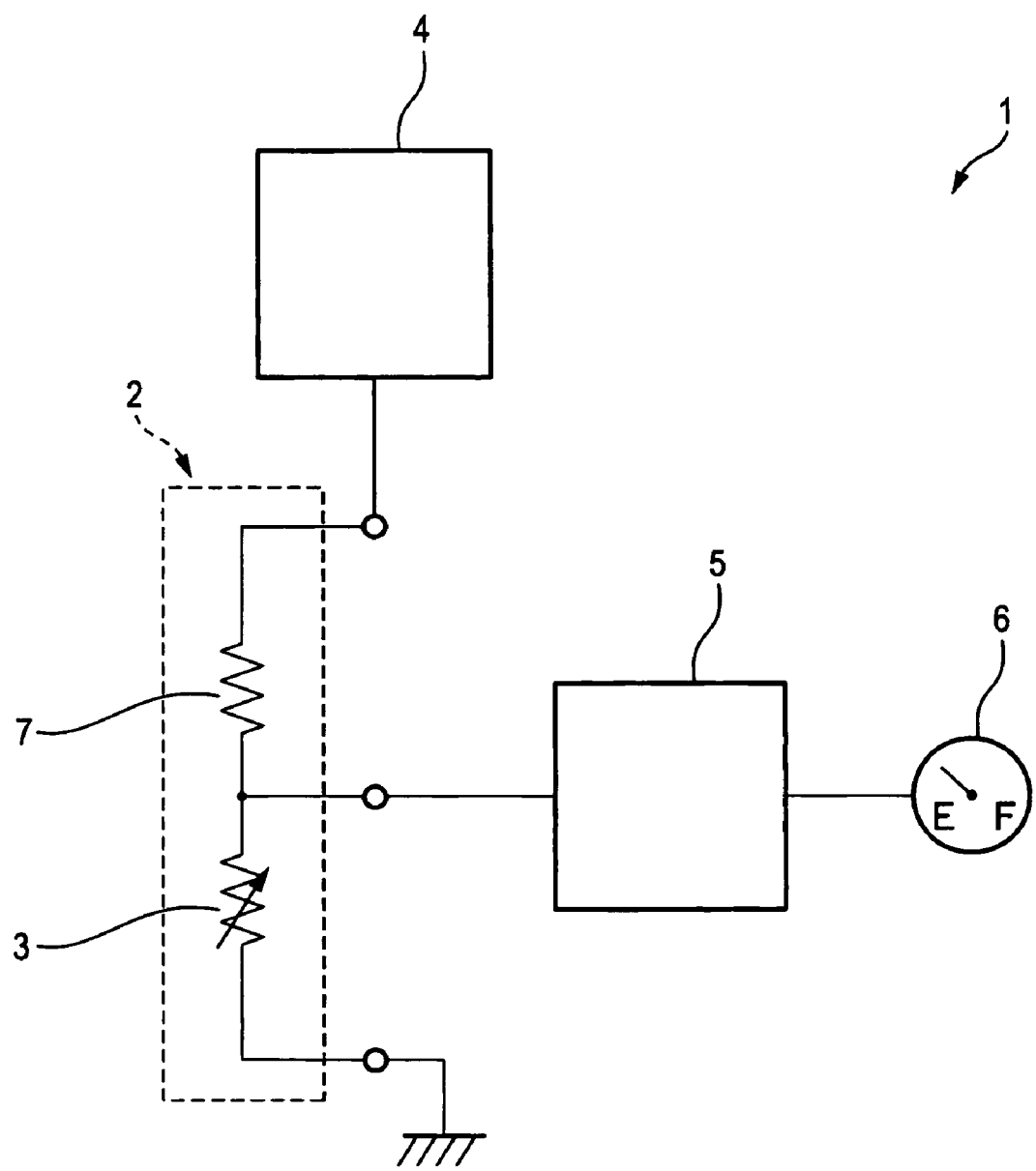
FIG. 1 is a diagram which illustrates a schematic configuration of an embodiment of a liquid level detection device according to the invention.
Figure 2:
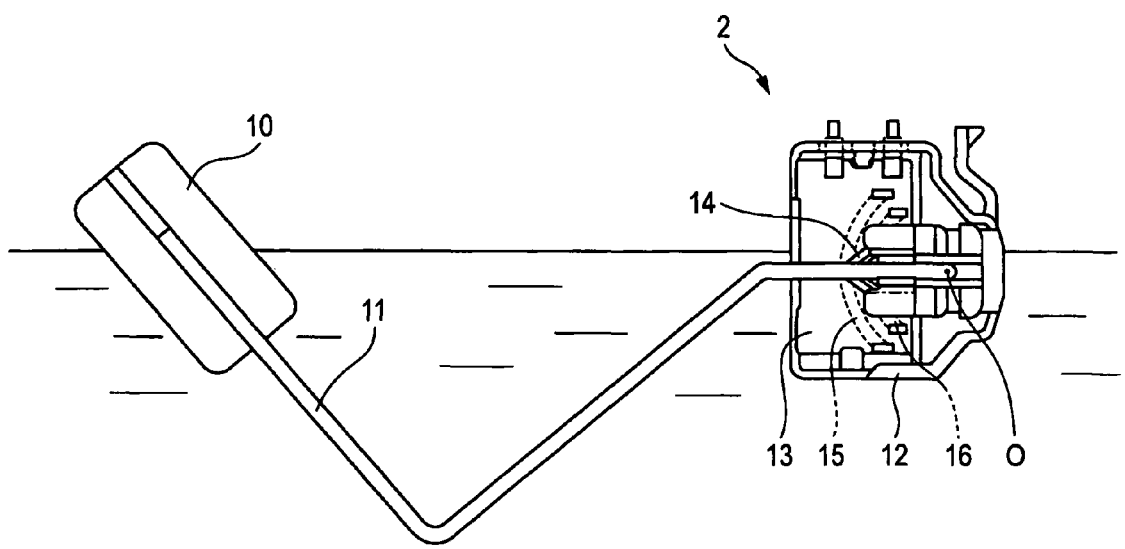
FIG. 2 is a diagram which illustrates a sensor for used in the liquid level detection device shown in FIG. 1.
Figure 3:
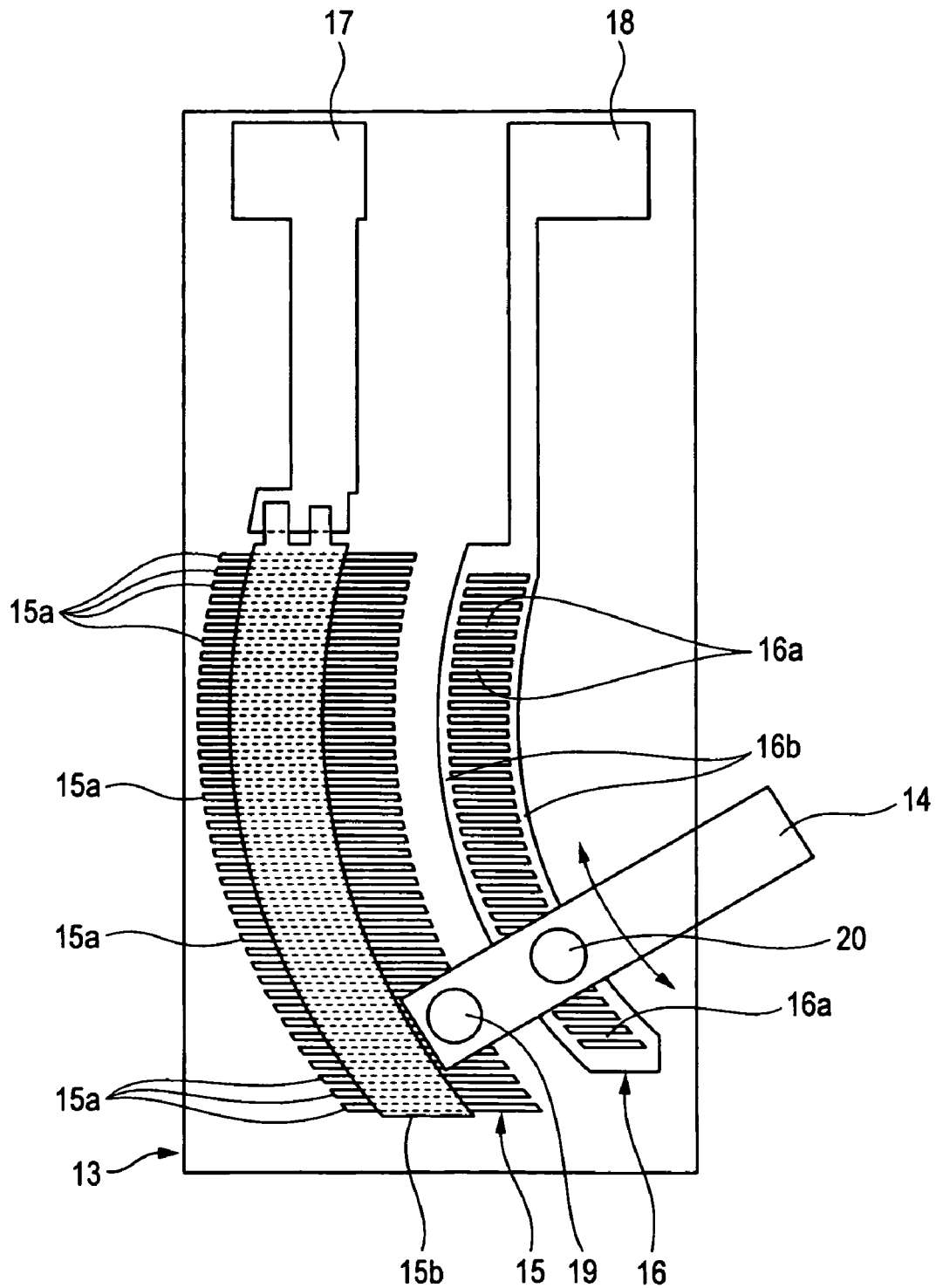
FIG. 3 is a diagram which illustrates a main part of the sensor shown in FIG. 2.
Figure 4:
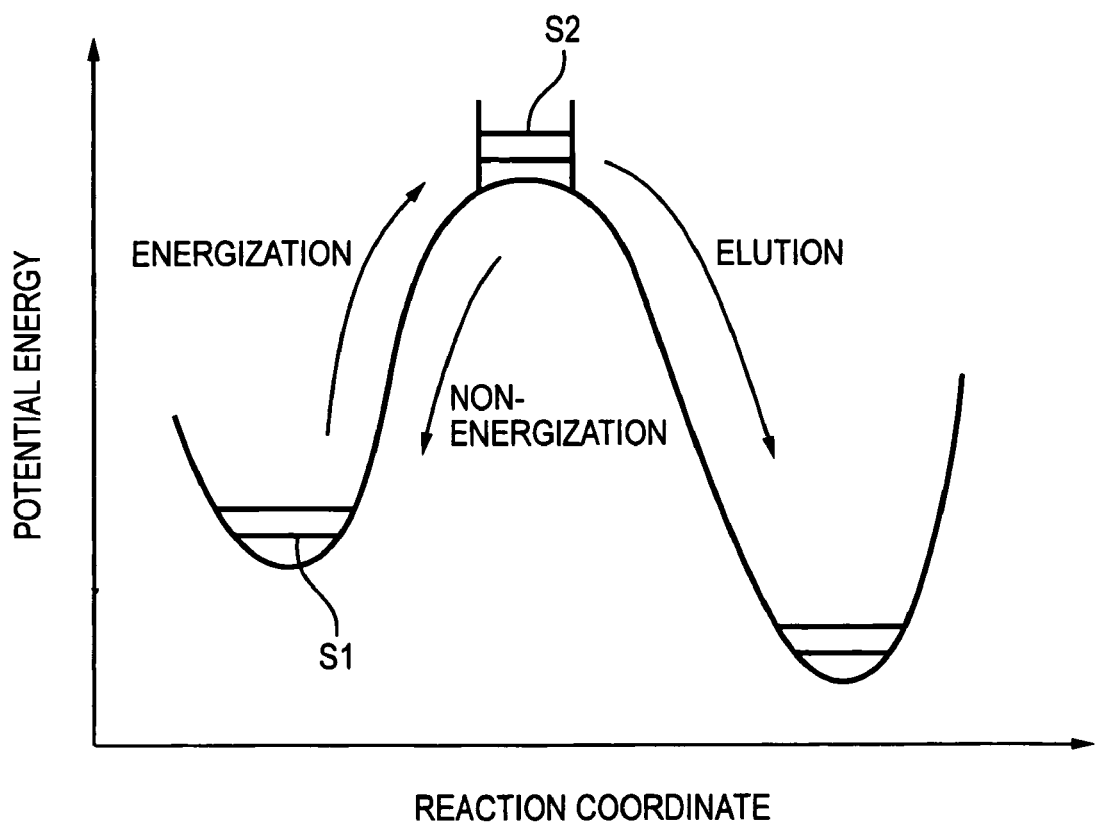
FIG. 4 is a diagram which illustrates a state of energy in a reaction process of electrolytic corrosion.

FIG. 1 is a diagram which illustrates a schematic configuration of an embodiment of a liquid level detection device according to the invention, FIG. 2 is a diagram which illustrates a sensor for use in the liquid level detection device shown in FIG. 1, and FIG. 3 is a diagram which illustrates a main part of the sensor shown in FIG. 2.

As shown in FIG. 1, a liquid level detection device 1 of this embodiment includes a sensor 2 which is disposed within a container which stores a liquid. The sensor 2 has a variable resistance 3 which changes a resistance value by allowing a contact to move in association with a change in liquid level and outputs a signal according to a resistance value of the variable resistance 3 when a predetermined voltage is applied thereto. In addition, the liquid level detection device 1 includes a power supply circuit 4 which applies a predetermined voltage to the sensor (refer, for example, to Patent Document No. 1.).

Referring to FIG. 2, the sensor 2 includes an arm 11 having a distal end to which a float 10 adapted to float in the liquid is attached, a frame 12 which supports rotatably a proximal end portion of the arm 11, a circuit board 13 mounted on the frame 12, and a contact element 14 provided at the proximal end portion of the arm 11.

As shown in FIG. 3, a first conductive pattern 15 and a second conductive pattern 16 are provided on a surface of the circuit board 13, and these first conductive pattern 15 and second conductive pattern 16 extend in parallel to each other into an arc-like shape about a rotational axis O of the arm 11 (refer to FIG. 2). An input/output conductive portion 17 is provided at one end of the first conductive pattern 15, and an input/output conductive portion 18 is provided at one end of the second conductive pattern 16.

The first conductive pattern 15, which is situated on an outside diameter side of the sensor 2, is constructed by a plurality of conductive segments 15a which are disposed in its circumferential direction at predetermined intervals and a resistor 15b which electrically connects the plurality of conductive segments 15a to each other. In addition, the second conductive pattern 16 is constructed by a plurality of conductive segments 16a which are disposed in its circumferential direction at predetermined intervals and a connector 16b which electrically connects the plurality of conductive segments 16a to each other.

The conductive segments 15a of the first conductive pattern 15 and the conductive segments 16a of the second conductive pattern 16 are formed of, for example, silver palladium which has a superior resistance to corrosion, and the resistor 15 is formed of, for example, ruthenium oxide which has a superior resistance to corrosion.

Two contacts 19, 20, which are electrically connected to each other, are provided on the contact element 14. The contact element 14 rotates about the rotational axis O of the arm 11 while linking with rotation of the arm 11 and slides over the conductive segments 15a of the first conductive pattern 15 at the contact 19 to connect to any of the conductive segments 15a. At the same time, the contact element 14 slides over the conductive segments 16a of the second conductive pattern 16 at the contact 20 to connect to any of the conductive segments 16a. By this configuration, the length of the resistor 15b which is interposed in a circuit lying between the input/output conductive portion 17 to the input/output conductive portion 18 is changed, whereby the resistance value of the circuit is changed. Namely, the variable resistance 3 is made up of the first conductive pattern 15, the second conductive pattern 16 and the contact element 14.

The sensor 2 also includes a fixed resistance 7 which connects to the input/output conductive portion 17 at one end thereof so as to be connected in series to the variable resistance 3. A predetermined voltage is applied to the variable resistance 3 and the fixed resistance 7 by the power supply circuit 4.

The float 10 fluctuates while linking with a change in liquid level, and the arm 11 rotates in association with such fluctuations of the float 10. The contact element 14 rotates in association with rotation of the arm 11, whereby the resistance value of the variable resistance 3 changes. The voltage applied to the variable resistance 3 and the fixed resistance 7 is divided according to a ratio of the resistance value of the variable resistance 3 to the resistance value of the fixed resistance 7, and the voltage so divided to be applied to the variable resistance 3 is detected between the input/output conductive portions 17, 18 as an output signal of the sensor 2.

Here, when sliding contact surfaces of the conductive segments 15a of the first conductive pattern 15, the conductive segments 16a of the second conductive pattern 16 and the contacts 19, 20 of the contact element 14, that is, contact portions are exposed to the electrolytic liquid, in the event that the voltage is normally applied to the sensor without interruption, for example, the conductor of the first conductive pattern 15 on the anode side is deteriorated, and on the other hand, metal ions which are eluted from the first conductive pattern 15 separate out in the second conductive pattern 16 on the cathode side. The metals that have so separated out tend to easily be turned into an insulator, and when the sliding contact surfaces of the conductive segments 16a of the second conductive pattern 16 are covered with the insulation substance, the contact resistance at the contact portions rises, interrupting an accurate measurement.

Then, in the liquid level detection device of this embodiment, the power supply circuit 4 is made to apply the voltage to the sensor 2 intermittently on a predetermined cycle, and a conducting time during which the voltage is applied to the sensor 2 is set to 40 ms or less per cycle, whereby even when the contact portions are exposed to the electrolytic liquid, the electrochemical reaction such as electrolytic corrosion at the contact portions is suppressed. A ratio of the conducting time per cycle, that is, a duty ratio is preferably taken as 50% or less.

Referring to FIG. 1 again, the liquid level detection device 1 obtains the voltage between the input/output conductive portions 17, 18 of the sensor 2 as an output signal of the sensor 2 at a processing circuit 5. Note that the processing circuit 5 obtains the output signal of the sensor in synchronism with the cycle on which the power supply circuit 4 applies the voltage to the sensor 2. Then, the processing circuit 5 drives a gauge 6 as an indication device for indicating a residual amount of the liquid based on the output signal of the sensor 2 so obtained.

EXAMPLES

To verify the effectiveness of the invention, liquid level detection devices like the liquid level detection device 1 were prepared which were given different conducting times to sensors 2, the liquid level detection devices so prepared were then submerged in ethanol mixed gasoline for 500 hours, and thereafter, outputs of the respective sensors 2 were measured. The measuring conditions will be shown below. Note that the measurements were carried out with contact elements 14 fixed in a position where the contact elements 14 rotated when the level of liquid in the containers changed to the lowest level. In addition, the measurements were carried out with circuit boards 13 submerged in the liquid.

Figure 5:
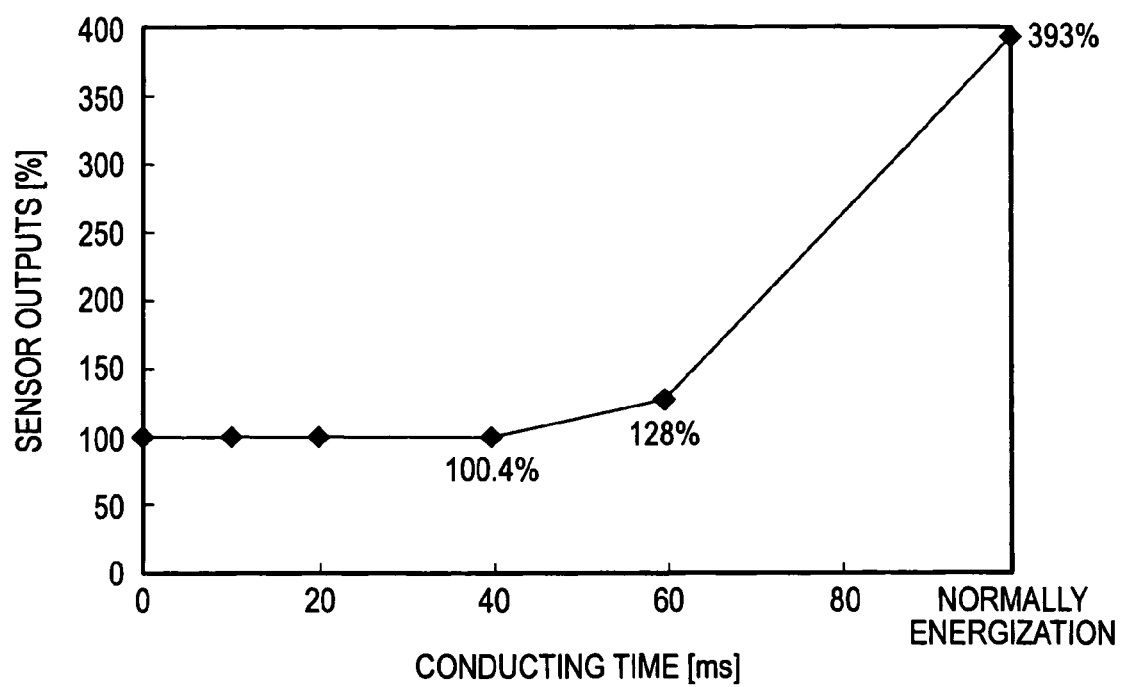
FIG. 5 is a graph showing the results of measurements on sensor outputs with respect to the embodiment and a comparison examples.

[Measuring Conditions]
Material of Conductive Segments 15a, 16a: silver palladium
Material of Resistor 15b: ruthenium oxide
Applied Voltage to Sensor 2: 16V
Concentration of Ethanol Mixed Gasoline: 30%
Temperature of Ethanol Mixed Gasoline: 60° C.
Cycle: 100 ms The results of the measurements are shown in FIG. 5. Note that in a graph shown in FIG. 5, outputs of the respective sensors are shown as a ratio against outputs of the sensors before they were submerged in the liquid, which outputs were used as reference. It is seen from the results of the measurements shown in FIG. 5 that with the conducting time to the sensor 2 being 40 ms or less, the rising ratio of the output of the sensor is 0.4% or less and falls within a range which constitutes no interruption to the detection of liquid levels. This is because the contact resistance at the contact portions does not rise, and in other words, it is seen that the electrochemical reaction such as electrolytic corrosion at the contact portions is suppressed.

Figure 6:
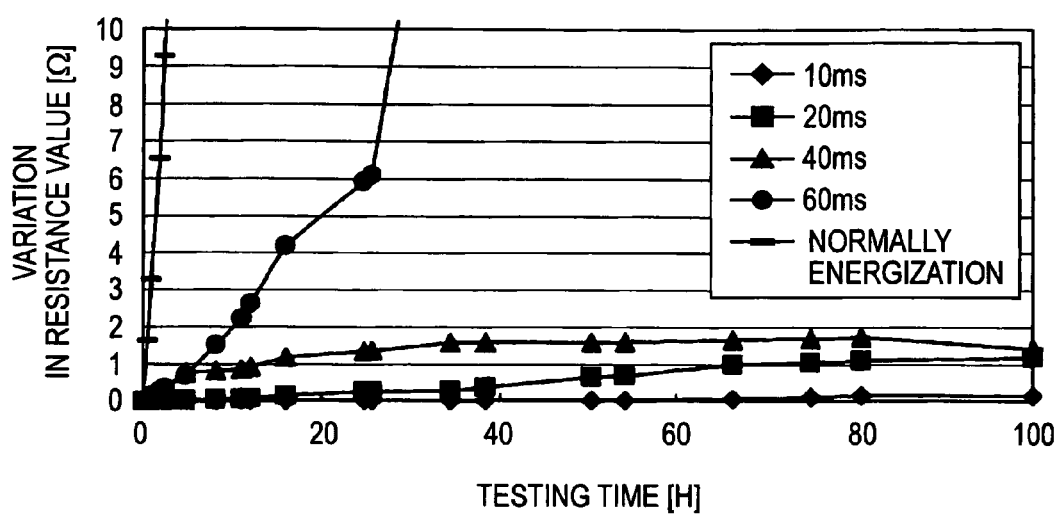
FIG. 6 is a graph showing the results of measurements on sensor resistance values with respect to the embodiment and the comparison examples.
Figure 7:
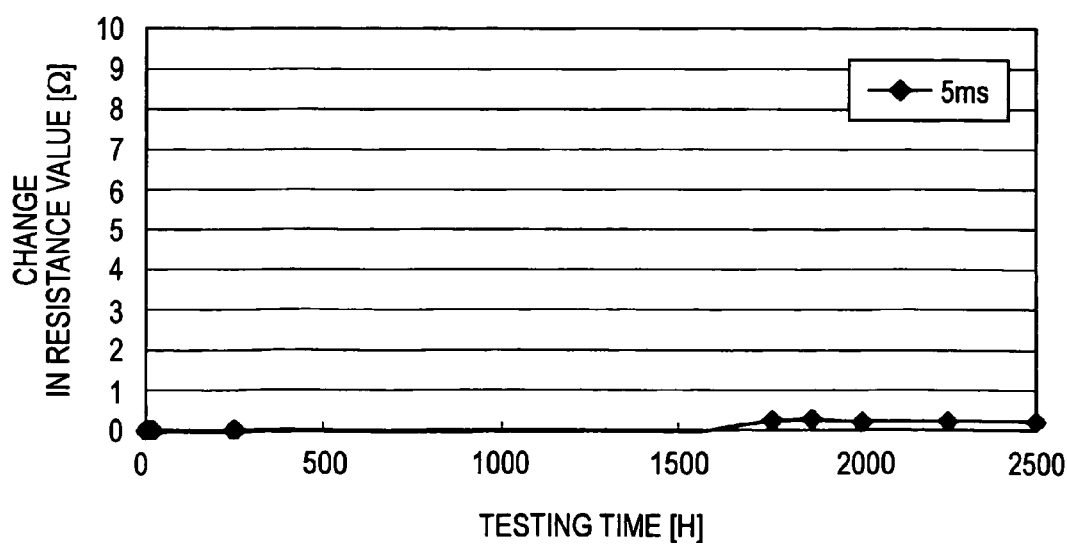
FIG. 7 is a graph showing the results of measurements on sensor resistance values with respect to the embodiment.

In addition, under the measuring conditions described above, the conducting time to the sensor 2 per cycle was set to 10 ms, 20 ms, 40 ms, 60 ms and normally energized condition on the liquid level detection devices to measure variations in resistance value of variable resistances 3 with time, the results of which are shown in FIG. 6. In addition, under the measuring conditions described above, the conducting time to the sensor 2 per cycle was set to 5 ms to measure variations in resistance value of the variable resistance 3 with time, the results of which are shown in FIG. 7.

From the results of the measurements shown in FIG. 6, when the conducting time to the sensor 2 is 40 ms or less, the variation (increase) in the resistance value of the variable resistance 3 is less than 2Ω and falls within a range which constitutes no interruption to the detection of liquid levels. Furthermore, it is seen from the result of the measurement shown in FIG. 7 that with the conducting time to the sensor 2 per cycle being 5 ms, almost no variation is recognized in the resistance value of the variable resistance 3 and hence that 5 ms is particularly preferable as the conducting time per cycle.

Next, the first conductive pattern 15 and the second conductive pattern 16 of the sensors 2 of the liquid level detection device 1 were individually submerged in ethanol mixed gasoline while their positional relationships on the sensor 2 maintained and capacitors were formed. Then, a voltage was applied to the first conductive pattern 15 and the second conductive pattern 16 while changing variously the conducting time per cycle to measure currents flowing to both the patterns 15, 16. Measuring conditions then will be described below.

Figure 8:
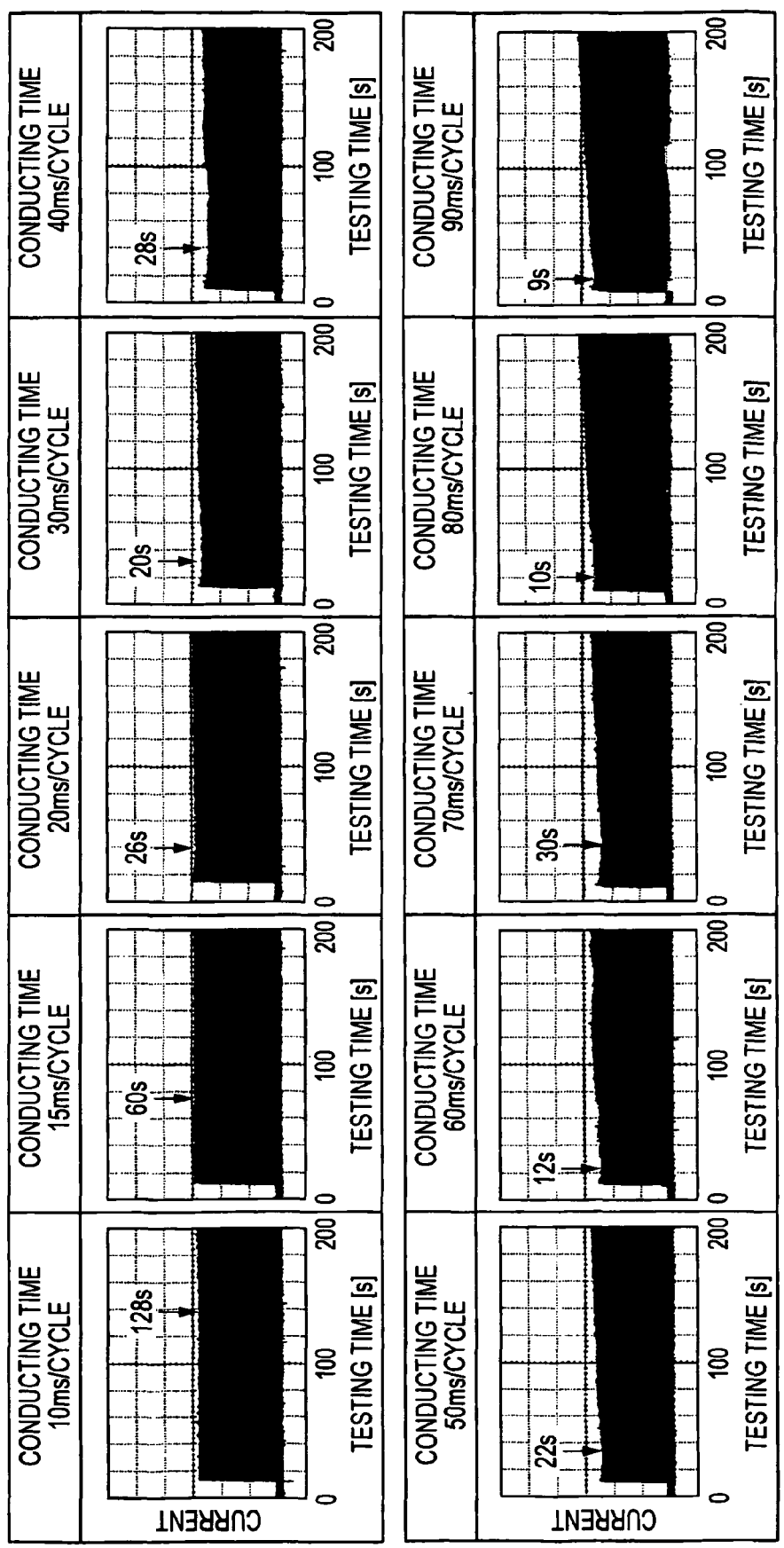
FIG. 8 is a graph showing the results of measurements on current values with respect to the embodiment and a comparison examples.
Figure 9:
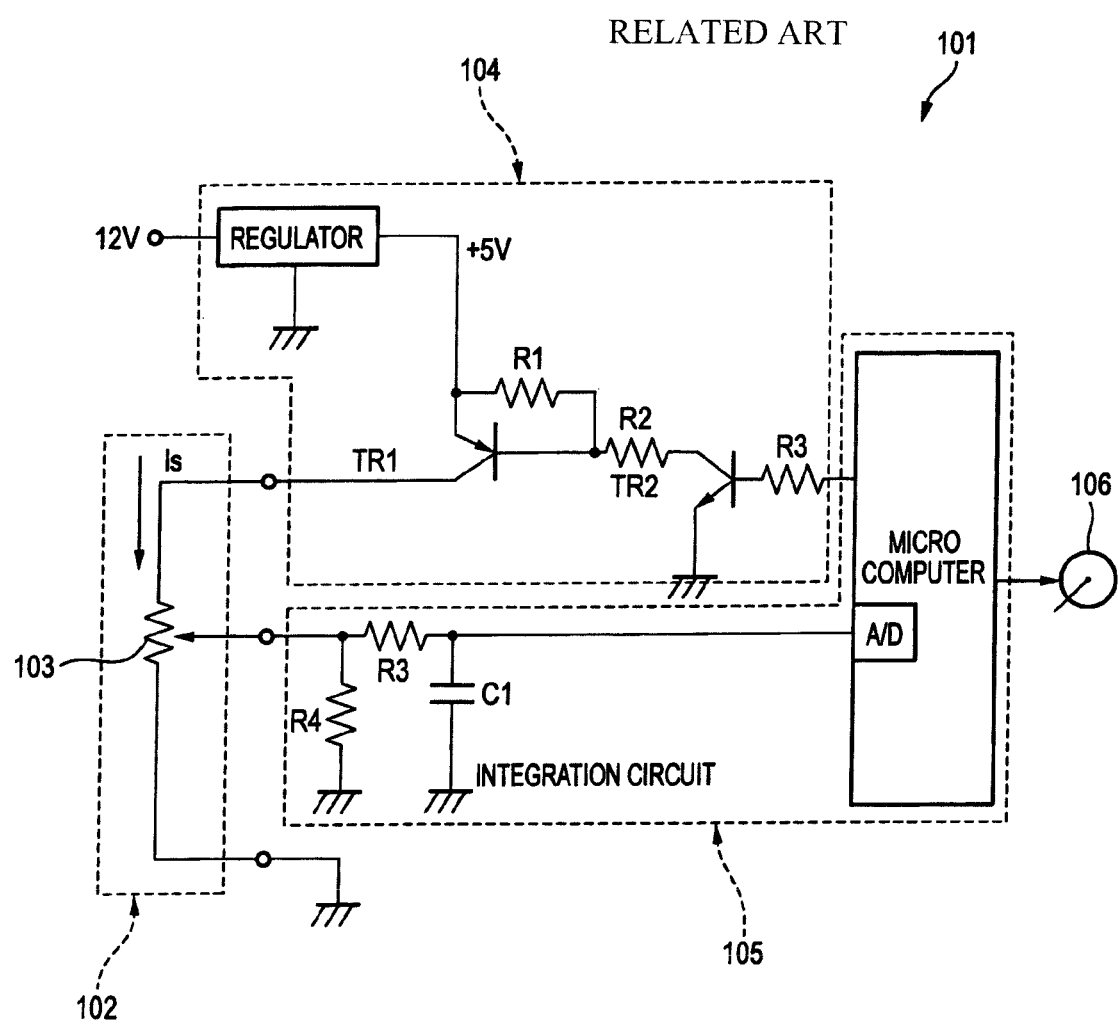
FIG. 9 is a diagram which illustrates an example of a conventional liquid level detection device.
Figure 10:
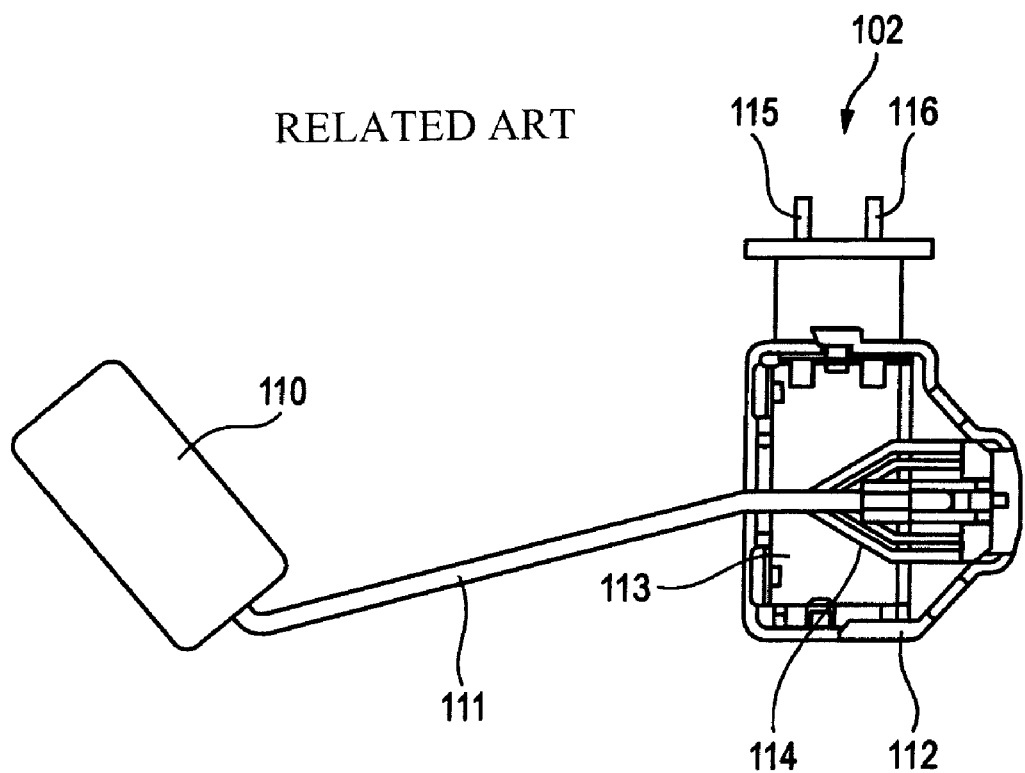
FIG. 10 is a diagram which illustrates an example of a sensor for use on the conventional liquid level detection device.

[Measuring Conditions]
Material of Conductive Segments 15a, 16a: silver palladium
Material of Resistor 15b: ruthenium oxide
Applied Voltage to Sensor 2: 16V
Concentration of Ethanol Mixed Gasoline: 30%
Temperature of Ethanol Mixed Gasoline: 18° C.
Cycle: 100 ms Measuring results per conducting time and times when the current value exhibited a rising tendency are shown in FIG. 8. It is seen from the measuring results shown in FIG. 8 that with the conducting time per cycle being 15 ms or less, the time required until the current value started to rise was 60 seconds or more and that the suppression tendency of elution of metal ions was increased remarkably.

Thus, as has been described heretofore, by applying the voltage to the sensor 2 intermittently on the predetermined cycle and setting the conducting time during which the voltage is applied to the sensor 2 to 40 ms or less per cycle, even in the event that the liquid level detection device 1 is exposed to the electrolytic liquid, the chemical reaction such as electrolytic corrosion at the contact portions of the variable resistance of the sensor 2 can be suppressed, whereby the liquid level can be detected with high accuracy over a long time period.

Note that the invention is not limited to the embodiment that has been described heretofore but can freely be altered, modified and improved in various ways as required. In addition, the materials, configurations, dimensions, numeric values, forms, numbers, locations to be disposed of the constituent elements of the embodiment described above are arbitrary and hence not limited, provided that the invention can be attained.

The present application is based on Japan Patent Application No. 2007-281972 filed on Oct. 30, 2007, the contents of which are incorporated herein for reference.

What is claimed is:

1. A liquid level detection device comprising:
a sensor provided in a container which stores a liquid therein and having a variable resistance which changes a resistance value in association with a change of liquid level to output a voltage signal according to the resistance value of the variable resistance when a voltage is applied to the sensor; and
a power supply circuit applying the voltage to the sensor intermittently on a predetermined cycle,
wherein a conducting time during which the power supply circuit applies the voltage to the sensor is equal to or less than 15ms per cycle and greater than 1 ms per cycle, and a ratio of the conducting time in one cycle is 50% or less and is configured to suppress electro chemical reactions.

2. The liquid level detection device as set forth in claim 1, wherein the conducting time is substantially 5 ms per cycle.

3. The liquid level detection device as set forth in claim 1, wherein the variable resistance includes:
first conductive patterns and second conductive patterns which are extended in parallel to each other; and
a contact element which slides on the first conductive patterns and the second conductive patterns in association with the change of the liquid level; and
wherein the conducting time per cycle is set to a predetermined time so that a time period that elapses until a current flowing to the first and second conductive patterns comes to indicate a rising tendency is equal to or greater than 60 seconds when the voltage is applied to the sensor in a state that a contact portion between the contact element and the first and second conductive patterns is electrically insulated.

* * * * *